United States Patent [19]

Craun

[11] Patent Number: 4,742,096
[45] Date of Patent: May 3, 1988

[54] POWDER COATINGS WITH CATALYZED TRANSESTERIFICATION CURE

[75] Inventor: Gary P. Craun, Berea, Ohio

[73] Assignee: The Glidden Company, Cleveland, Ohio

[21] Appl. No.: 891,624

[22] Filed: Aug. 1, 1986

Related U.S. Application Data

[63] Continuation-in-part of Ser. No. 871,444, Jun. 6, 1986.

[51] Int. Cl.$^4$ .............................................. C08L 63/00
[52] U.S. Cl. .................................... 523/400; 523/428; 525/340; 525/379; 528/93
[58] Field of Search ................. 528/93; 523/428, 400; 525/340, 379

[56] References Cited

U.S. PATENT DOCUMENTS 4,489,182 12/1984 Valko .................................. 523/403
4,559,180 12/1985 Green ................................. 560/103

Primary Examiner—Joseph L. Schofer
Assistant Examiner—Bernard Lipman
Attorney, Agent, or Firm—Thomas M. Schmitz

[57] ABSTRACT

Improved powder coating compositions comprise a hydroxyl functional binder having carboxylic ester functionality and a transesterification cure catalyst comprising an epoxide and a non-acidic nucleophile, preferably onium salts. Resins such as hydroxyl functional acrylic, hydroxyl functional polyester, ester functional polyesters, and methyl succinate esters of bisphenol epoxides transesterify in the presence of an epoxide and phosphonium salts such as tetrabutylphosphonium acetate and yield coatings having exceptional hardness, impact resistance and solvent resistance at bake temperatures of about 300° F.

11 Claims, No Drawings

POWDER COATINGS WITH CATALYZED TRANSESTERIFICATION CURE

This is a continuation-in-part application of commonly assigned copending Ser. No. 871,444 filed June 6, 1986, (Docket 10244), incorporated herein by reference.

The invention relates to powder coating compositions adapted to cure by transesterification using Epoxy/Nucleophile catalysts.

BACKGROUND OF THE INVENTION

Transesterification of an ester moiety with an alcohol component is known to proceed according to the scheme:

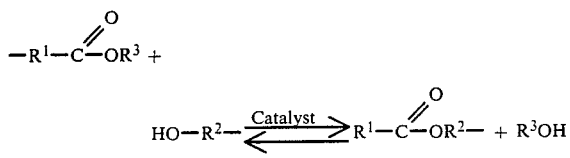

The reaction is an equilibrium reaction, that can be driven to completion by removal of the evolved alcohol especially if it is a lower molecular weight alcohol such as methanol or ethanol. Transesterification is an especially suitable reaction for producing thermoset coatings because the lower alcohols evolved during the cure easily pass out of the coating and allow the reaction to go to completion. Highly crosslinked films result. Several catalyst types are known for transesterification. These include acids, bases, and metal salts of organic acids. A number of patents, including U.S. Pat. Nos. 4,362,847; 4,376,848; 4,332,711; and 4,459,393 describe metal ion complexes and/or metal salts used for promoting transesterification. These are incorporated herein by reference for general exemplification of resinous binder types that can be crosslinked by transesterification and to illustrate the prior art catalysts such as octoates or naphthenates of lead, zinc, calcium, barium, and iron.

In U.S. Pat. No. 4,559,180 Green teaches a process for the transesterification of a carboxylic or carbonic acid ester under transesterification conditions with an alcohol in the presence of either a Group V element containing Lewis base or a cyclic amidine and an epoxide.

Kooijmans et al (U.S. Pat. No. 4,362,847 and U.S. Pat. No. 4,332,711) teach thermosetting binders for paints comprising a non-acidic hydroxyl-containing resin and a non-acidic polyester having a beta-hydroxyl ester group.

Dante and Parry have shown that phosphonium halides, such as ethyltriphenyl phosphonium iodide, are efficient catalyts for (a) 1,2-epoxide reactions with phenols to yield hydroxy ethers (U.S. Pat. No. 3,477,990), and (b) polyepoxide reactions with carboxylic acids or acid anhydrides (U.S. Pat. No. 3,547,885). Parry has shown that polyepoxides and phenols can be reacted to form phenolic hydroxy ethers with phosphonium salts as catalysts. The counterion of the phosphonium moiety is the anion portion of a carboxylic acid, or acid ester, such as in ethyltriphenyl phosphonium acetate (U.S. Pat. No. 3,948,855).

Barnhoorn et al (U.S. Pat. No. 4,459,393) teach self-crosslinking thermosetting resin compositions obtained from the reaction of a beta-hydroxyalkyl ester or an alpha,beta-carboxylic acid with a primary mono- or polyamine to give a product having 1 to 2 amino hydrogens and further reacted with a polyglycidyl ether of a polyhydric phenol so that the final resin adduct has more than one beta-hydroxyalkyl ester group and amino groups having 1 to 2 amino hydrogen atoms per molecule.

Subramanyam et al (U.S. Pat. No. 4,376,848) teach the preparation of water dilutable electrocoating compositions having tertiary amino-containing basic binders by reacting a secondary amino group compound with an olefinically double-bonded epoxy and the copolymerization of this product with at least one ethylenically bonded polymerizable monomer wherein said binders can self-cure and be cured in combination with amine resins and/or phenolic resins.

In the powder coatings field there is an ongoing need for improved cure chemistry. The transesterification cure patents noted above suffer from low cure efficiency, high temperature baking schedules, require expensive activated esters, and give poor hydrolytic film stability. Although U.S. Pat. Nos. 3,477,990, 3,547,885 and 3,948,855 teach phosphonium salts as catalysts for epoxy/phenol, epoxy/acid and epoxy/epoxy reactions they did not recognize that the combination catalyst of phosphonium salts with free epoxides are effective transesterification catalysts.

BRIEF SUMMARY OF THE INVENTION

The invention relates to new transesterification cure catalysts for powder coatings comprising a nucleophile and an epoxide selected from the group consisting of a monomer, an oligomer or polymer having one or more reactive epoxide groups.

A further object relates to powder coating composition adapted to cure by transesterification following application to a substrate which comprises: (a) a resinous binder having hydroxyl functionality and lower alkyl carboxylic ester functionality wherein said hydroxyl and ester functionality is derived from one or more monomer, dimer, oligomer or polymer; (b) an in-situ formed transesterification catalyst which comprises 0.001 to 1.0 milliequivalents epoxide and 0.001 to 1.0 milliequivalents non-acidic nucleophile or onium salt per gram of coating.

A further object relates to substrates coated with such composition and cured by transesterification.

DETAILED DESCRIPTION OF THE INVENTION

The instant invention relates to new coatings which comprise a binder having hydroxyl functional groups and lower alkyl ester carboxylic ester functional groups adapted to cure after application to a substrate by transesterification; and an in-situ formed transesterification catalyst comprising a non-acidic nucleophile and an epoxide wherein the said epoxide is a monomeric or polymeric epoxide selected from the group consisting of $C_{2-18}$ alkylene oxides, arylalkylene oxides, cycloaliphatic oxides, and a polymeric or oligomeric epoxide having at least one epoxide group per molecule. The nucleophile is selected from the group consisting of non-acidic nucleophile or onium salts.

For the instant powder coating compositions, the hydroxyl and/or ester functionality may be derived from individual compounds, dimers, oligomers or polymers and mixtures or both ester precursor functionality may be part of the same oligomer or polymer including polyesters, polyepoxides, polyacrylates and methacrylates, polyamides, polyamines, polycarbonates and mixtures thereof. The catalyst is preferably formed in-situ in the coating by the addition of about 0.001 to 1.0 milliequivalents non-acidic nucleophile and about 0.001 to 1.0 milliequivalents epoxide per gram of coating. Preferred catalysts are those derived from the reaction of an epoxide including polymeric epoxides and onium salts. Especially preferred are phosphonium salt catalysts.

The instant in-situ catalysts effect cure for various polyfunctional alkyl esters admixed with various polyols. For example, a coating can contain:

(a) a blend of polyalkyl esters (R—$(CO_2R')_m$) and polyols (R"—$(OH)_n$); or
(b) a multifunctional compound containing both ester and hydroxyl functionality, e.e., R'''$(CO_2R')_x(OH)_y$; or
(c) a blend of (A) and (B); and
(d) an effective amount of a transesterification catalysts comprising an epoxide and a non-acidic nucleophile.

In the above coatings the further addition of a monoalcohol and/or monoester is useful for limiting crosslink density of the coating and act as film softeners.

The catalyst for the transesterification is formed in situ by the reaction of a nucleophilic compound X with an oxirane:

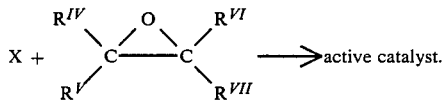

wherein X is a non-acidic nucleophile or non-acidic nucleophilic onium salt. Most preferred are terminal oxiranes wherein $R^{VI}$ and $R^{VII}$ both are H as they are most reactive with nucleophiles. $R^V$ can be H or simple alkyl, simple aryl, or more complex moieties. $R^{IV}$ represents simple or complex alkyl or aryl radicals.

Examples of epoxides useful for the in-situ preparation of the cure catalyst include $C_{2-18}$ alkylene oxides and oligomers and/or polymers having epoxide functionality including multiple epoxy functionality. Particularly suitable alkylene oxides include propylene oxide, 1,2-butylene oxide, 1,2-hexylene oxide, tert-butyl glycidyl ether, phenyl glycidyl ether, glycidyl acetate, and glycidyl benzoate. Useful multifunctional oxiranes include bisphenol A diglycidyl ether, diglycidyl adipate, 1,4-diglycidyl butyl ether, Novalac resins and other commercial epoxy resins. Bisphenol A diglycidyl ether epoxides which are solids at 20° C. are preferred epoxides. Also useful are acrylic polymers having epoxide functionality such as acrylic copolymers derived from glycidyl methacrylate. Oxirane compounds wherein only $R^{VI}$ and $R^{VII}$ are H include isobutylene oxide (2-methyl-1,2-propene oxide), 2-methyl-1,2-hexene oxide, 2-phenyl-1,2-propene oxide (alphamethyl styrene oxide), 2-phenoxy methyl-1,2-propene oxide, and the like. Other oxiranes include 2,3-dimethyl-2-butene oxide, 2-methyl-2-butene oxide, oleic acid oxide, and 1-phenyl propene oxide.

The nucleophilic compound X can include covalent materials such as tertiary amines, tertiary phosphines, sulfides and the like as described below. The compound X can be ionic wherein the anion component possesses the nucleophilic moiety. These include various "onium" halides and carboxylates as detailed below. Various other heterocyclic compounds are nucleophiles and can be used, such as imidazoles, imidazolines, thiazoles and the like. Compounds such as secondary amines or mercaptans can also be used though they are less preferred as they must react twice to form the active catalyst.

By non-acidic nucleophile is meant a nucleophile not bearing an active hydrogen, which becomes acidic upon reaction with an epoxy. Secondary amines have an active hydrogen and, hence, must be reacted twice to generate the effective catalyst. These secondary amines, although useful, are not preferred.

Nucleophiles of the ionic type include:
(1) quaternary ammonium compounds such as for example tetraethyl ammonium chloride, tetrapropyl ammonium acetate, and hexyl trimethyl ammonium bromide;
(2) quaternary phosphonium compounds such as tetrabutyl phosphonium bromide and chloride, tetraphenyl phosphonium iodide and the like. Ethyl triphenyl phosphonium acetate is a preferred nucleophile because it is commercially available at low cost.
(3) "pseudo" halides;
(4) an N-alkylated pyridinium salt such as hexadecyl pyridinium bromide, chloride, and acetate.

Other onium catalyst components include arsonium compounds such as tetraphenyl arsonium chloride and bromide and the like. Various sulfonium compounds are useful; for example, tributyl sulfonium chloride, dibutyl phenyl sulfonium acetate, S-butyl 1,4-butyl sulfonium benzoate and the like. Useful pseudo halides include cyanides, azides, cyanates and the like.

The onium catalyst component of the present invention and particularly phosphonium salt catalysts are advantageous in that they are not only excellent catalysts but function as latent catalysts for the transesterification. Formulated powder paints (before application) have superior storage stability and the catalysis occurs only on baking following application of the coating to a substrate. Substantially no reaction occurs on storage at ambient temperature and the catalyst becomes active at cure temperatures of 250°–400° F.

Coatings catalyzed by the epoxide/nucleophile transesterification catalysts are conveniently referred to as ENCAT coatings. ENCAT coatings comprise a wide variety of monomers, oligomers, and resins having the requisite hydroxyl and/or ester functionality include polyesters, polyacrylates, polyepoxides, polyamides, polyamines, monoalcohols, monoesters, polyols and mixtures thereof.

This invention can be used to form films which have exceptional physical properties and are derived from ester-terminated epoxy compounds. Films prepared from blends of polyesters containing hydroxyls and esters of low boiling alcohols have good physical properties and low raw materials costs.

Cure conditions vary with the concentrations of free epoxy and nucleophile as well as the type of alcohol which leaves during the transesterification reaction. Lower boiling alchols allow faster, lower temperature cures than higher boiling alcohols. Thus, the adduct of GT-7074 (Ciba-Geigy) and monomethyl succinate will cure well at 250° F. in 20 to 30 minutes, while the mono-n-butyl succinate adduct only partially cures at 300° F. in 20 minutes.

ENCAT catalysts are effective curing agents for epoxy esters of bisphenol A type epoxies and dicarboxylic acid monoesters. After cure, these coatings have a composition which is similar to that of epoxy/anhydride coatings, but our formulations do not contain irritating acid anydrides. Epoxy esters prepared with methyl succinate can be cured at about 300° F. to form films with 3H and 5H pencil hardness, impact resistance of 140 inch/pounds forward and reverse, excellent solvent resistance, no cracking or tape pull off in mandrel bending.

Coating compositions are formulated from one or more of the various ester-containing components, one or more of the hydroxyl-containing components, and various blends of catalyst components. Generally, the coating will be formulated with about equal quantities of the co-reactive esters and alcohols although other ratios are useful for specific purposes. The coatings may include other less reactive esters or alcohols that are not considered in determining this reactive ratio. Likewise reactive diluents containing only a single reactive ester of reactive alcohol can be included in the coatings formulation.

The quantity of catalyst components needed in the instant compositions can vary widely. Either catalyst component concentration can range from about 0.001 to 1.0, preferably 0.05 to 0.5, milliequivalents per gram of binder. The ratio of equivalents nucleophile to epoxide can vary from about 10:1 to 1:20. Preferably, an equal equivalent of nucleophilic component and of oxirane component will be used. However, the equivalent ration can vary especially toward an excess of oxirane. The concentration of catalyst components needed will depend upon the reactivity of the individual components with one another as well as upon curing temperature and time.

One of the powder coatings of the instant invention adapted to cure by transesterification comprise a major portion of an ester derivative produced by an epoxy-acid reaction of an epoxy with a monoalkyl ester of a diacid or acid anhydride and transesterification catalyst comprising an epoxide and a nucleophilic compound, especially a phosphonium salt.

Any bisphenol A, epichlorohydrin type epoxy that is of sufficient molecular weight to be a solid at room temperature is suitable to make the ester derivative. It is expected that Novalac type epoxy resins will also be suitable. Generally the monoalkyl ester of a diacid is mixed with the epoxy at a 1:1 mole ratio of free carboxylic acid to epoxide, but a 10 to 20% excess of either component can be tolerated. Excess epoxy will remain in the derivative and provide the free, unreacted epoxy, as catalyst component. Reaction of the epoxy with the free acid can be carried out at any temperature above about 80° C. Higher temperatures, such as about 100° to 150° C. may be desirable to melt the epoxy and keep it free flowing during the reaction. Small quantities of a catalyst, such as a phosphonium salt, a tertiary amine or another nucleophile can be added at levels up to about 1% to shorten the reaction time.

Monoalkyl esters of various diacids or anhydrides can be used. It is convenient to mix an equal molar quantity of an anhydride, such as succinic anhydride, with a lower alkyl alcohol, such as methanol, and simply allow the alcohol to open the anhydride ring at about 50° to 100° C. Monoesters of other diacids such as monomethyl adipate or monoethyl glutarate can be used. Lower alkyl, primary alcohols, such as methanol, ethanol, n-butanol and the like are preferred, because these low molecular weight alcohols will easily evaporate and leave the film during cure. Secondary or higher primary alcohols, however, can be used, alone or in combination with lower primary alcohols.

The free epoxy in this formulation can be any bisphenol A or glycidyl type epoxy that is of sufficient molecular weight or tack so as not to cause the power paint to block or sinter during storage.

The phosphonium salt catalysts can be represented generally by the formula:

$$R_1R_2R_3R_4 P^+ X^-$$

where $R_1$, $R_2$, $R_3$, and $R_4$ are independently selected from the group consisting of aromatic, aliphatic, alkenyl, cycloaliphatic and cycloalkenyl radicals; and X is an anion. Suitable anions include halide, preferably bromide or chloride, and carboxylic acid residue, preferably acetate anion.

Useful phosphonium salts include such compounds as tetrabutylphosphonium acetate, ethyltriphenylphosphonium acetate, various phosphonium halides and the like. Although other nucleophiles will provide some cure, phosphonium salts have been found to be particularly useful for powder formulations. Phosphonium salt catalysts are particularly advantageous for use with epoxy resin binders, with acrylate resin binders and with polyester resin binders.

Various hydroxyl functional acrylic resins can be used in ENCAT powder coatings. Powder coating resins typically have Tg's above 40° C. and sufficiently high molecular weights so that the formulated powder paint remains a free flowing powder at room temperature, but lower Tg polymers can be used preferably in a minor proportion. Hydroxyl functionality can be provided by monomers such as hydroxypropyl methacrylate, hydroxyethyl acrylate, hydroxyethyl methacrylate and the like at levels of about 5 to 40 weight percent basis total monomer. Acrylate and methacrylate esters of polyols with two or more hydroxyl groups also can be utilized to develop specific properties. Other monomers that can be copolymerized with the hydroxy functional monomers to yield hydroxy functional acrylate resins are the vinylic monomers such as styrene and various other acrylate and methacrylate monomers. Various alkyl carboxylic diesters or polyester can be added to provide crosslinking. Dimethylterephthalate is particularly used in this regard. Of the onium catalysts those comprising phosphonium salts and epoxides are preferred for use with acrylic resins.

Hydroxyl functional polyesters commonly used for powder paints can be cured by the ENCAT catalysts of the present invention. As noted above, diesters such as dimethyl terephthalate or ester functional polyesters are suitable components for crosslinking purposes. Polyesters with terminal ester functionality, such as those obtained by transesterification of dimethyl isophthalate and a diol such as neopentyl glycol (with a molar excess of diester) can be crosslinked with diols and polyols including for example neopentyl glycol, pentaerythritol, trimethylol propane and/or hydroxy functional polyester oligomers. As with the acrylic resins, phosphonium salt/epoxide catalysts are the preferred catalysts because they (1) are effective at lower levels (2) do not discolor on baking as do tertiary amines and phosphines and (3) maintain their catalytic activity during storage of the powder paints.

The presence of carboxylic acid functionality in the coating will retard the onset of transesterification. Indeed, if excessive amounts of carboxylic acid are present, the oxirane component will be entirely consumed without the formation of the catalytic intermediate necessary for transesterification. This restriction must be kept in mind while formulating coatings based on the instant invention. The retarding effect of small quantities of carboxylic acid can be used advantageously to improve the package stability of the instant coating compositions.

Catalysts prepared with phosphonium salts and epoxides are preferred for good storage stability in coatings formulations. Powder paints with phosphonium salts do not lose epoxide functionality or lose their ability to cure well with time. Catalysts containing tertiary amines lack the stability of those prepared with phosphonium salts. Catalysts prepared with onium salts are much preferred for powder coatings.

Evaluation of Film Properties

Coatings were applied at 1-2 mil thickness to phosphate treated cold-rolled steel panels and baked for 20 minutes at 300° F. to 350° F. Film properties were evaluated using the following evaluation:
(1) marring after 100 MEK double rubs;
(2) pencil hardness;
(3) cracking after forward and reverse impact with a ⅜-inch ball up to 160-inch pounds impact; and
(4) cracking or loss of adhesion after conical mandrel bend down to ⅛-inch diameter 180° bend.

MEK Double Rubs

A cotton rag is wrapped around the index finger, soaked with methylethyl ketone and then wiped with a 2-inch stroke across the coated surface. Up and back motions with moderate pressure are counted as one rub. Resoak rag with MEK after each 20 rubs. Record number of rubs to the point where the coating is just removed, or after 100 rubs record percentage of mar if the coating has not been removed.

The following illustrative Examples should not be narrowly construed. Unless otherwise indicated, parts and percentages are by weight and temperature is given in degrees Centigrade.

EXAMPLE 1

Preparation of Ester Resin Vehicle from Epoxy

An epoxy derivative was prepared from the following coponents:

| Ingredients | Grams |
| --- | --- |
| Methanol | 173 |
| Succinic Anhydride | 494 |
| Bisphenol A type Epoxy (1,000 equivalent weight) | 5,300 |

The anhydride and methanol were gradually heated under reflux to 100° C. and maintained two hours at 100° to 110° C. The epoxy and 15 grams benzyldimethylamine were added and the mixture heated to about 120° C., held at that temperature for about two hours and then cooled. The product had a residual acid of 0.08 MEQ/g. and a residual epoxy of 0.06 MEQ/g.

EXAMPLE 2-7

Powder coatings were formulated from the vehicle of Example 1 by extruding the mixes shown in Table I at 80° C. (Mixes were preblended in a Welex blender for one minute to assure uniformity. Phosphonium salts in methanol were adsorbed onto the $TiO_2$ to aid in dispersion). The hot blend was passed from the extruder through a chilled two roll mill to form a flake. The flake was ground in a Bantam mill and sieved using a 140-mesh screen.

The resulting powder was sprayed on to Parker Bonderite 1000 24 ga. panels, and baked at 300° F. for 20 minutes. Film thicknesses ranged from 1.2 to 1.8 mil.

TABLE I

| Example | Epoxy Resin of Example 1 (g) | GT7013 (g) | Nucleophile* (g) | $TiO_2$ (g) | Benzoin (g) | PL200*** (g) |
| --- | --- | --- | --- | --- | --- | --- |
| 2 | 1,500 | 225 | 113 TPP[1] | 1,268 | 9 | 18 |
| 3 | 1,000 | 100 | 15 DABCO[2] | 760 | 6 | 10 |
| 4 | 1,000 | 100 | 30 DABCO[2] | 760 | 6 | 10 |
| 5 | 1,000 | 100 | 30 TBPAA[3] | 760 | 6 | 10 |
| 6 | 1,000 | 100 | 15 TBPAA[3] | 760 | 6 | 10 |
| 7 | 1,500 | 150 | 20 ETPPAA[4] | 0 | 9 | 15 |

*GT7013 = 400 equivalent weight bisphenol A type epoxy (Ciba-Geigy)
[1]TPP = triphenylphosphine
[2]DABCO = 1,4-diazabiscyclo(2.2.2)octane
[3]TBPAA = tetrabutylphosphonium acid acetate (70% in methanol)(Morton Thiocol)
[4]ETPAA = ethyltriphenylphosphonium acid acetate (70% in methanol)(Morton Thiocol)
***PL200 = flow and leveling aid for powder formulations (SBS Chemical)

EXAMPLE 8

Film Properties

The film properties of the powder coatings of Examples 2-7 are shown in Table II.

TABLE II

| Example | MEK DR* | ⅛" Mandrel Bend | ⅜" Impact (in. lb.) | Pencil Hardness |
| --- | --- | --- | --- | --- |
| 2 | 10 | Not tested; assume no cure | | |
| 3 | 90 | — | 30 | 3H |
| 4 | 40 | — | 30 | H |
| 5 | 100 (no mar) | no cracks | 160 | 5H |
| 6 | 100 (slight mar) | no cracks | 160 | 4H |
| 7 | 100 (full mar) | no cracks | 100 | 3H |
| 9 | 100 (full mar) | no cracks | 50 | 4H |
| 10 | 100 (full mar) | fine cracks | 10 | H |

*Solvent rubs with a methylethyl ketone soaked rag to the point of first film removal. #5 had no evidence of marring after 100 rubs.

EXAMPLE 9

Preparation of Acrylic (ENCAT) Powder Coating

Powder coatings were formulated according to the method of Example 2 using commercial hydroxyl functional acrylic as follows:

| Ingredients | Grams |
| --- | --- |
| Poly-Tex 1000 Acrylic Resin* (hydroxyl value = 93, AN = 16) | 663 |
| GT 7013, 400 eq. wt. Epoxy** | 133 |
| PL-200 | 9 |
| Benzoin | 9 |
| TiO$_2$ | 550 |
| Tetrabutyl phosphonium acetate, 70% in Methanol | 30 |
| Dimethyl terephthalate | 117 |

*Celanese
**Ciba-Geigy

The coating was applied to cold roll steel test panels using an electrostatic spray. The coating was baked at 325° F. for 20 minutes.

The results in Table II show that tetrabutyl phosphonium acetate is an effective transesterification catalyst for hydroxy functional acrylic binders.

EXAMPLE 10

Preparation of Hydroxyl Functional Polyester Powder Coating

The powder coating was formulated as follows:

| Ingredients | Grams |
| --- | --- |
| Cargil 3008 Polyester Resin* (hydroxyl value = 295, AN = 3.5) | 500 |
| TiO$_2$ | 760 |
| Dimethyl terephthalate | 500 |
| GT 7013** | 200 |
| Ethyltriphenyl phosphonium acetate, 70% in Methanol | 22 |
| Benzoin | 6 |
| PL-200 | 10 |

*Cargill, Incorporated
**Ciba-Geigy

As shown in Table II, ethyl triphenyl phosphonium acetate is an effective catalyst component using hydroxyl functional polyester powder coatings.

I claim:

1. A powder coating composition adapted for curing by transesterification following application to a substrate, the powder coating containing a catalytic amount of transesterification catalyst to initiate transesterification upon heating the powder coating applied to the substrate, the powder coating composition comprising:

a polymeric binder containing hydroxyl functional groups and an alkyl ester containing 1–10 carbon atoms and further containing carboxylic ester functional groups adapted to transesterify with said hydroxy groups in the presence of catalytic amounts of a transesterification catalyst, the transesterification catalyst comprising an epoxy compound containing oxirane functionality in combination with a non-acidic nucleophilic compound substantially free of an active hydrogen and adapted to react with the oxirane functionality to form an in-situ transesterification cure between the binder hydroxyl functional groups and the carboxylic ester functional groups, where said non-acidic nucleophilic compound is an onium salt, and said powder coating contains between 0.001 and 1 milliequivalents of said non-acidic nucleophilic compound and between 0.001 and 1 milliequivalents per gram of said coating.

2. The powder coating of claim 1 wherein the transesterification catalyst comprises an epoxide and a phosphonium salt.

3. The powder coating of claim 2 wherein the transesterification catalyst comprises an epoxide and an ammonium salt.

4. The powder coating of claim 2 wherein the epoxide is a bisphenol A epoxide and the onium salt is tetrabutyl phosphonium acetate or ethyltriphenyl phosphonium acetate.

5. The powder coating of claim 2 wherein the binder comprises a methyl succinate ester of a bisphenol A type epoxide having both ester and hydroxyl functionality.

6. The powder coating of claim 2 wherein the binder is a hydroxyl functional acrylic resin.

7. The powder coating of claim 2 wherein the binder comprises a hydroxyl functional polyester.

8. The powder coating of claims 6 or 7 wherein the carboxylic ester is a dialkyl phthalate.

9. The powder coating of claim 8 wherein the carboxylic ester is dimethyl terephthalate.

10. The powder coating of claim 2 wherein the binder is a C$_{1-10}$ alkyl carboxylic ester functional polyester.

11. A powder coating composition adapted for curing by transesterification following application to a substrate which comprises:

(a) a binder having hydroxyl functional groups and C$_{1-10}$ alkyl carboxylic ester functional groups; and (b) a transesterification catalyst which comprises 0.001 to 1.0 milliequivalents epoxide and 0.001 to 1.0 milliequivalents; Phosphonium salt having the formula:

$$R_1R_2R_3R_4P^+X^-$$

where $R_1$, $R_2$, $R_3$, and $R_4$ are independently selected from the group consisting of aromatic, aliphatic, alkenyl, cycloaliphatic and cycloalkenyl radicals; X is an anion selected from the group consisting of halide and carboxylic acid residue.

* * * * *